United States Patent [19]

Horsch

[11] 4,134,483
[45] Jan. 16, 1979

[54] LUBRICANT COOLED FRICTION CLUTCH WITH TWO RATES OF FLOW

[75] Inventor: Joachim Horsch, Lombard, Ill.

[73] Assignee: International Harvester Company, Chicago, Ill.

[21] Appl. No.: 785,385

[22] Filed: Apr. 7, 1977

Related U.S. Application Data

[63] Continuation-in-part of Ser. No. 599,801, Jul. 28, 1975, abandoned.

[51] Int. Cl.² ............................................. F16D 13/72
[52] U.S. Cl. .............................. 192/113 B; 192/87.17; 188/264 E
[58] Field of Search .................. 192/113 B, 86, 106 F; 188/264 E

[56] References Cited

U.S. PATENT DOCUMENTS

| | | | |
|---|---|---|---|
| 3,059,746 | 10/1962 | Christenson | 192/113 B |
| 3,823,802 | 7/1974 | Winzeler | 192/113 B |
| 3,834,503 | 9/1974 | Maurer et al. | 192/113 B |

Primary Examiner—Benjamin W. Wyche
Attorney, Agent, or Firm—John W. Gaines; Ronald C. Kamp; F. David AuBuchon

[57] ABSTRACT

Transmission having a number of lubricant cooled friction engaging means, a majority of which at any time are nonselected for operation, and further having flow blocking sleeves individual to the friction engaging means, each providing a friction coupling in the power path for shift purposes. Means is provided therein to direct coolant flow at lo rate to each friction coupling when such coupling is not engaged, and to increase flow to hi rate thereto when it is engaged.

8 Claims, 11 Drawing Figures

FIG_11_

FIG_7_

LUBRICANT COOLED FRICTION CLUTCH WITH TWO RATES OF FLOW

The present application is a continuation in part of my co-pending Ser. No. 599,801 filed July 28, 1975, and now abandoned which itself was divided from my Pat. No. 3,913,616 patented Oct. 21, 1975, all owned by the same assignee.

This application relates to lubricant cooled friction engaging means, particularly fluid clutches and brakes each controlled so as to have two rates of cooling flow.

It is a known practice that fluid flow control and fluid pressure control are afforded to friction engaging means, e.g., a fluid clutch or fluid brake, by means of a single system. According to the practice, the fluid at the point it is being applied as hydraulic pressure to cause the friction engaging means to be operated or not is likewise used at or near the application point to provide hydraulic cooling flow to the same friction engaging means. The difference is the hydraulic operating pressure at that point is kept at line pressure whereas, where used for cooling at that point, it must be bled down to a pressure low but adequate for cooling flow. Heat from frictional engagement and disengagement can raise temperatures excessively high when there is no provision in the system for cooling.

The change in pressure in such a single system presents a problem. That is to say, cooling and clutch actuation occur only alternately. Otherwise, production of cooling flow while the friction means is engaged will cause available line pressure to bleed down, because the large or small proportion of flow allocated to cooling will inherently produce a large or small drop in line pressure. Continuously maintaining cooling flow at a steady rate is used as one attack on the problem mentioned, but doing so introduces drawbacks in the single system and other systems, particularly such a system involving a number of friction engaging means therein.

My invention in its provision of two rates of cooling flow to each of a number of friction engaging means, materially reduces or substantially eliminates the foregoing problem; in the transition to the higher rate, the comparatively drastically multiplied open-valve flow area exposed with the very first increment of shift movement here makes the outset of clutch flooding almost instantaneous, affording a real head start in the cooling process in contrast to comparable prior art two-rate systems, all as will now be explained in detail.

Features, objects, and advantages will either be specifically pointed out or become apparent when, for a better understanding of the invention, reference is made to the following description taken in conjunction with the accompanying drawings, which show a preferred embodiment thereof and in which:

FIG. 4 is a diagram showing how FIGS. 1, 2, and 3 are combined to show all portions of the transmission;

More particularly in FIGS. 1, 2, 3, and 5 a countershaft power shift transmission is shown effective for transmitting torque in various forward speed range and reverse speed range ratios dependent upon which friction engaging device in each of two sets is selectively engaged. The numerals 1, 2, 3, 4, and 5 refer to disk clutches in the respective devices by which the various power paths are established in accordance with the shift pattern. More specifically, clutches 1, 2, and 3 form a set of speed ratio or range clutches for the vehicle carrying the transmission system, and clutches 4 and 5 are in another set known as direction clutches in which the forward (F) clutch 4 conditions the transmission for forward drive of the vehicle and the reverse (R) clutch 5 is for reverse. Each gear ratio and direction is established by a direction clutch and speed clutch being engaged and, unless one clutch from each set is engaged, power will not be transmitted through the transmission. These speed clutches which are located in the output end, are technically the load clutch set because the selected one is conditioned to be engaged after the selected direction clutch and thus operates to pick up the load. The transmission will now be more fully explained.

The transmission as shown comprises: a front housing 10 for a coupling device, not shown, including an engine connected shaft 12 by which the vehicle engine, not shown, applies power to the transmission, and a coupling shaft 14 carrying a universal joint U; a transmission case 16 comprising an input shaft 18 connected to the universal joint U carried by the coupling shaft, a longitudinally passaged output shaft 20 defining with the input shaft a vertical reference plane, a countershaft 22, the center line of which is on the side of the vertical reference plane away from the viewer and is at a level at the actual center line position indicated, and a reverse idler shaft 24, the center line of which in actuality is on the side of the vertical reference plane away from the viewer and is at a level at the actual position indicated; and a vehicle steering and final drive including a bevel pinion 26 connected to the output shaft 20 for delivering the transmission power in order to drive the vehicle, which for example can be a crawler tractor, not shown.

Figure 3:
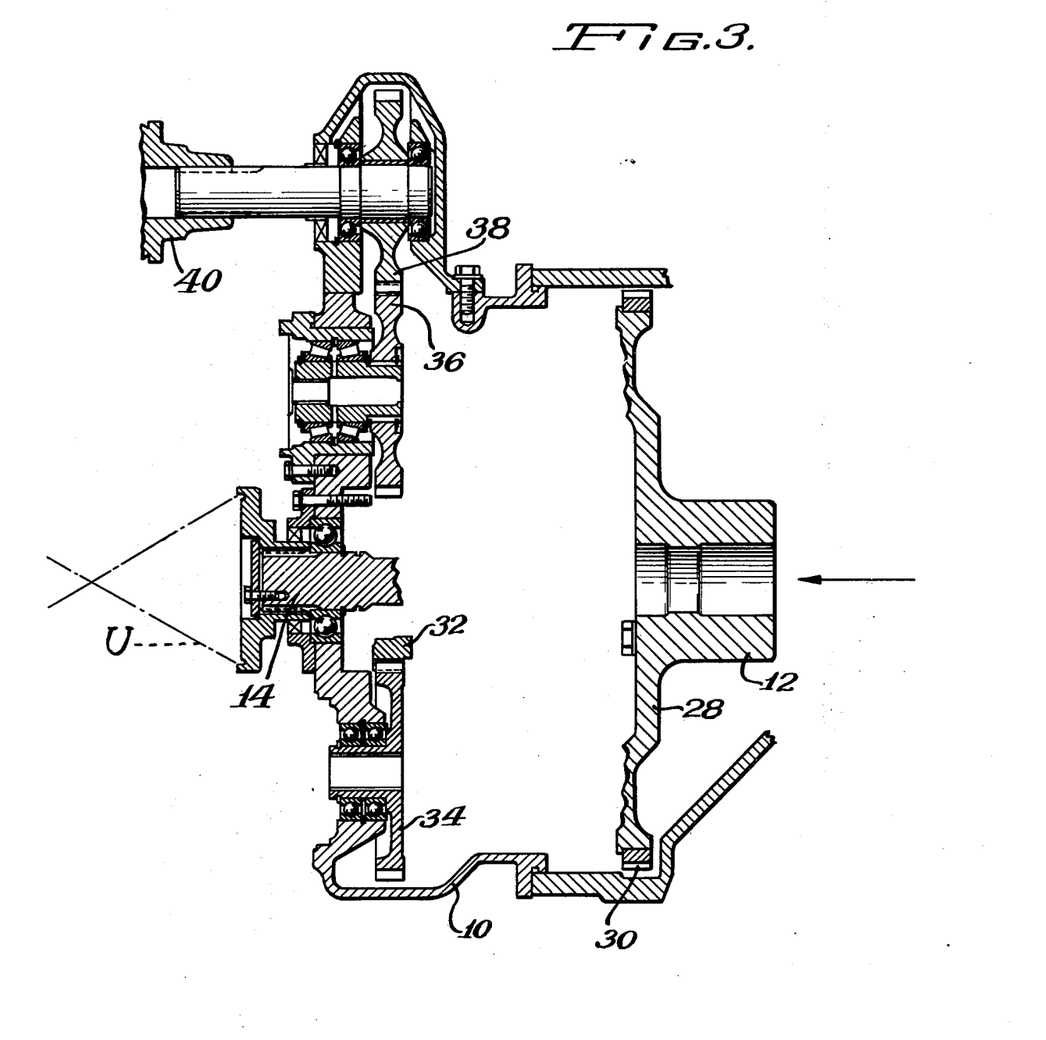
Figure 4:
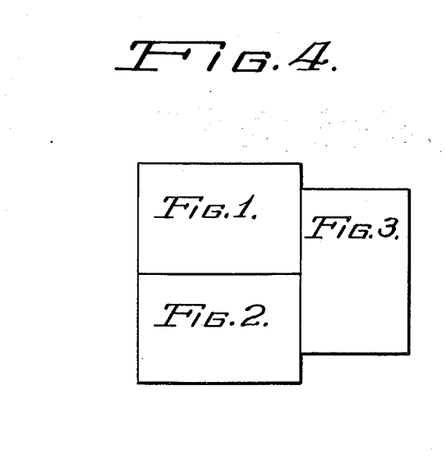

HOUSING FOR COUPLING — FIG. 3

Within the front housing 10, the engine connected shaft 12 carries an engine flywheel 28 provided at its periphery with a ring of starter gear teeth 30. By suitable connections thereto, the coupling device, not shown, interconnects the flywheel 28 and the coupling shaft 14 and, in addition, carries a partially shown pump drive pinion 32. The drive pinion 32 is directly connected to a lower pump gear 34, and is indirectly connected through a reverse idler 36 to an upper pump gear 38. The gears 34 and 38 individually drive components such as the upper component 40 which is a transmission pump.

Figure 1:
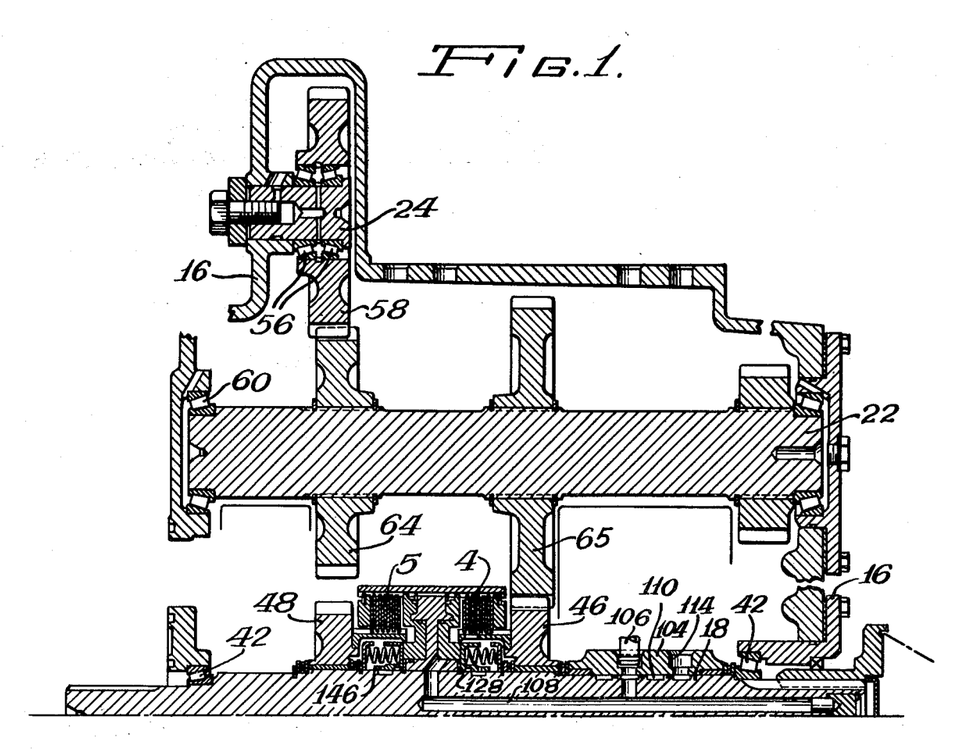
FIGS. 1, 2, and 3 are developed longitudinal elevational views of the respective upper rear, lower rear, and front portions of a vehicle transmission embodying the present invention.
Figure 2:
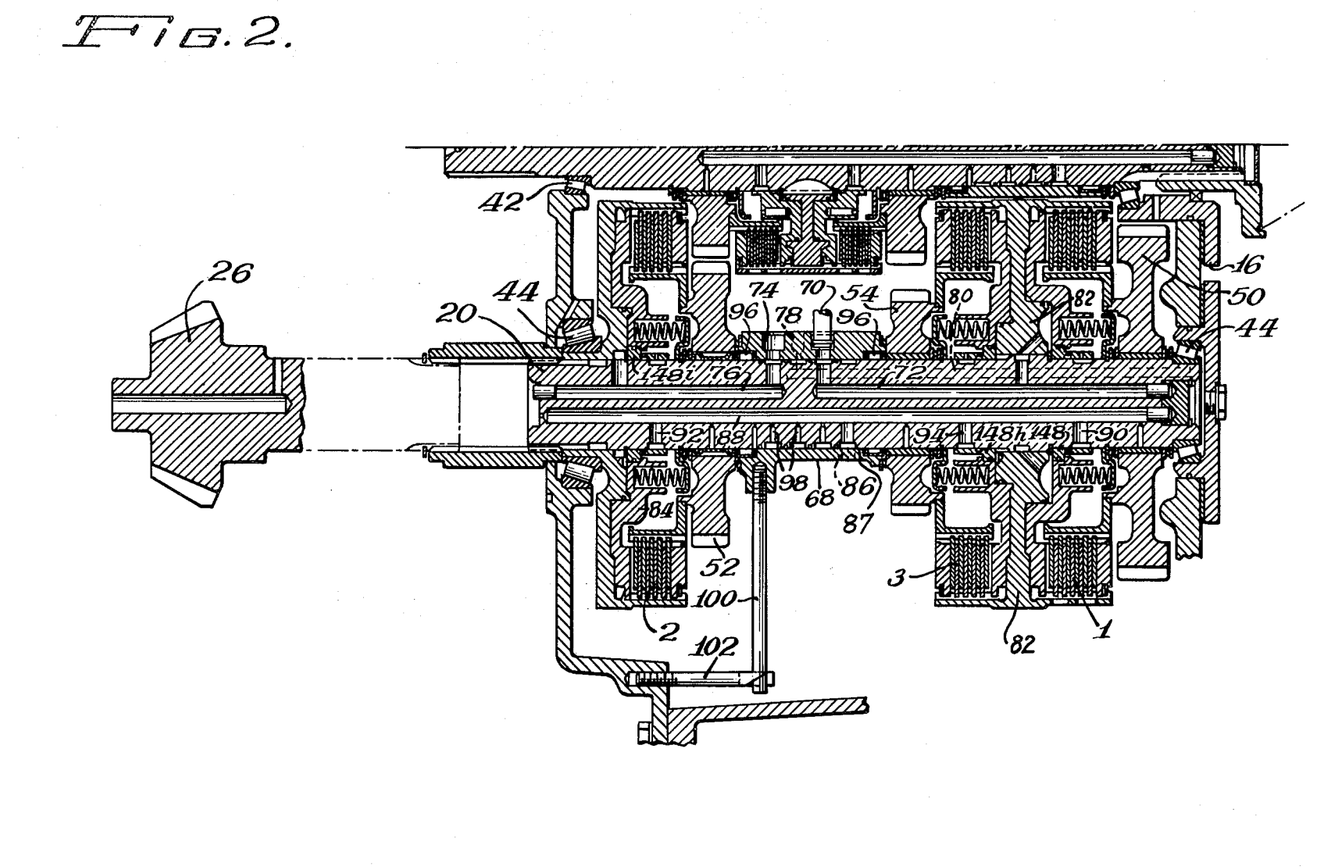
Figure 5:
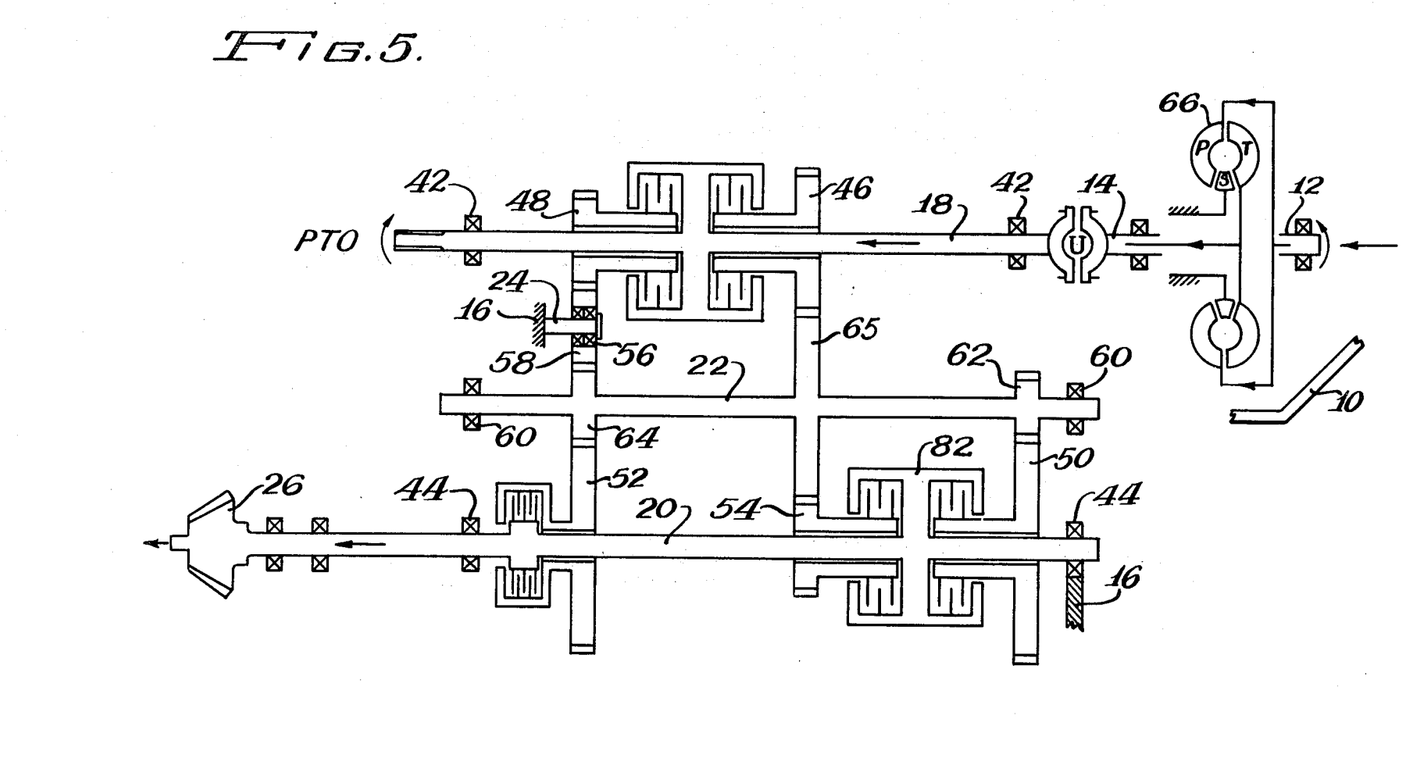
FIG. 5 is a simplified schematic view of the transmission, complete with a coupling device in the input and depicting the meshing operation more fundamentally.

TRANSMISSION CASE — FIGS. 1, 2, and 5

In the transmission case 16, a span of bearings 42 journals the input shaft 18 for rotation on its axis which is contained in the earlier referred to vertical reference plane, and a span of bearings 44 journals the output shaft 20 for rotation on its axis likewise contained in the vertical reference plane. A forward gear 46 and a reverse gear 48, relatively rotatably mounted on the input shaft 18, are controlled by the respective forward (F) clutch 4 and reverse (R) clutch 5 for rotation conjointly with or independently of the input shaft 18. A first gear 50, a second gear 52, and a third gear 54, relatively rotatably mounted on the output shaft 20 are controlled by the respective low speed clutch 1, medium speed clutch 2, and high speed clutch 3 for rotation of no more than one clutch conjointly with the output shaft and the rotation of the others independently of the output shaft.

A span of bearings 56 journals an idler gear 58 for rotation on the reverse idler shaft 24 which is fixed to the transmission case 16.

In the case 16, a span of bearings 60 journals the countershaft 22 which carries and jointly rotates with a low gear 62, an intermediate gear 64, and high gear 65. It is the latter gear 65 by which the input shaft establishes all power paths to the output shaft 20 in the forward range of speeds.

Specifically, power for high speed forward is transmitted in a direct path from the input shaft forward gear 46, through the intermeshing high gear 65 and third gear 54, through the load clutch 3 as it engages, thence through the output shaft 20 to the power delivering bevel pinion 26. Somewhat similarly, the power path for low speed is from the forward gear 46, through the gear 65 and low gear 62, through the first gear 50 and load clutch 1 as it engages, thence through the output shaft 20 to the pinion 26. For intermediate forward speed, power is transmitted from the forward gear 46, through the gears 65 and 52, through the load clutch 2 as it engages, thence through the output shaft 20 to pinion 26.

It is the power path through the idler gear 58 and intermediate gear 64 by which the reverse clutch 5 transmits the reverse range from the input shaft 18 to the output shaft. Specifically for intermediate speed, the power path is from the gears 48, 58, and 64, through the second gear 52 and load clutch 2 as it engages, thence through the output shaft 20 and pinion 26. High speed reverse power flow is from the same gears 48, 58, and 64, through the gears 65 and 54, through the load clutch 3 as it engages, thence into the output shaft and pinion 26. Finally, for low speed reverse, power flows from the gears 48, 58, and 64, through the gears 62 and 50 and load clutch 1 as it engages, thence into the output shaft 20 and pinion 26.

COUPLING — FIG. 5

The coupling illustrated within the housing 10 is a commercially availble torque converter 66, having toric blading forming respectively a pump P, a turbine T, and a stator S. The converter affords an infinitely variable ratio in the transmission up to low speed forward and up to low speed in reverse. Thereafter, a change speed power shift in the transmission will cause the vehicle to proceed at intermediate speed forward or reverse, and finally at high speed in forward or reverse. Also the converter allows the transmission to give the vehicle a smooth start up directly in the intermediate setting and directly in the high setting.

FLOATING MANIFOLDS — FIG. 2

The output shaft 20 at its intermediate section supports and is relatively rotatable within a floating manifold 68. The manifold is a sleeve which interconnects a first fluid line 70 and a shaft passage 72 included therein, interconnects a second fluid line 74 and a shaft passage 76 included in the line, and interconnects a third fluid line 78 and a shaft passage 80 included therein. The shaft passages 72 and 80 provide separate connections at opposite sides of a reaction member 82 between the clutches 1 and 3 for applying hydraulic pressure selectively to operate the two clutches. The shaft passage 76 in the second fluid line provides a connection to a piston 84 for the intermediate clutch 2 for applying hydraulic pressure to operate the latter.

The manifold 68 also interconnects a lube line 86 leading to a groove 87 and a longitudinal shaft passage 88 providing separate first, second, and third connections 90, 92, and 94 to clutches 1, 2, and 3 in order to introduce the flow of cooling fluid thereto.

By means of a needle bearings 96 at its ends, the cylindrical manifold 68 centers itself on the midsection of the output shaft 20 and can constantly adjust in position so that by proper shifting with the shaft it readily accommodates to shaft deflections. Seals which are shown between the respective rows of needle elements in the needle bearings and between the shaft and manifold 68 keep hydraulic fluid in the lines separate and are constantly lubricated through restricted passages 98 in the shaft leading from the longitudinal shaft passage 88 for lubricant.

The manifold 68 is held against rotation with the shaft by means of a radial rod 100 carried by the manifold and keyed at its outer end in a longitudinally extending fork 102 which is anchored to the case 16. The sleeve manifold is thus afforded freedom to move in two degrees, i.e., with radial sleeve adjustment slightly toward and away from the plane of the fork 102 as the rod reciprocates therein, and with slight longitudinal adjustment of the sleeve parallel to the output shaft and to the fork 102. The connection never allows the rod to revolve, and it shifts in the fork by sliding.

Similarly, a floating manifold 104 is mounted the same way for the same purpose on an intermediate section of the input shaft 18. The manifold 104 interconnects a forward fluid line 106 and a shaft passage 108 included therein, interconnects a reverse line 110 and a shaft passage 112 included in the reverse line, and interconnects a lube line 114 and a shaft passage 116 included therein for hydraulic cooling flow to the forward and reverse clutches 4 and 5. The shaft passages 108 and 112 provide separate connections through a reaction plate member 118 between the direction clutches 4 and 5 for applying hydraulic pressure selectively to operate the latter.

The manifolds are comparatively cheap, light, and small sleeves, free from rapid wear and friction drag, and readily staying centered on the supporting shaft for good sealing while the shaft deflects and undeflects. The purpose of the sleeve manifolds is not as any structural member to fix the shaft center line, but as a dynamic unresisting member staying accurately self centered to accommodate to all shaft deflections.

Figure 6:
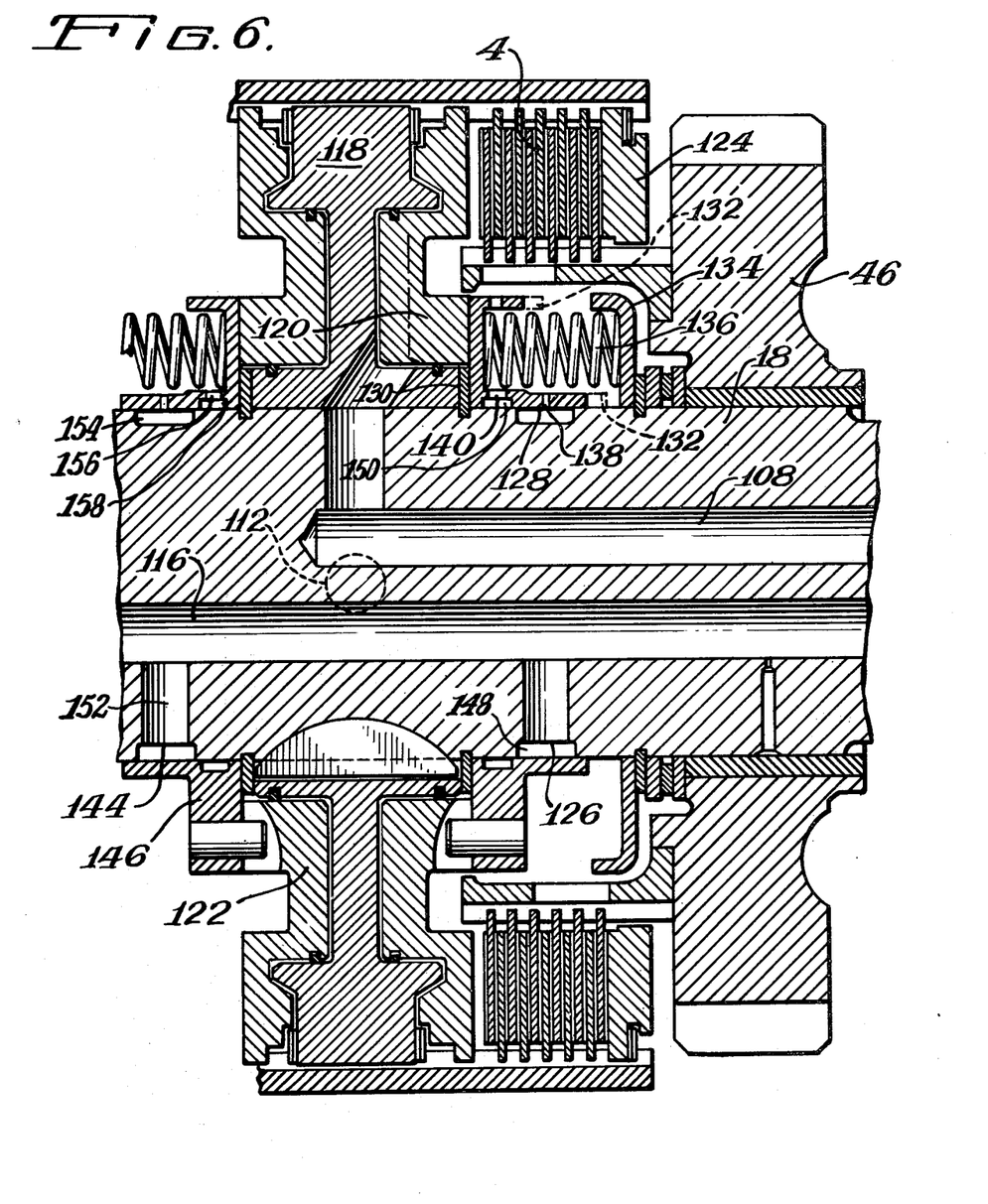
FIG. 6 shows a detail of FIG. 1 to an enlarged scale, namely, a hi-lo cooled direction clutch 4.

MULTIRATE FLOW — FIG. 6 TYPE

Annular forward and reverse pistons 120 and 122 are moved by hydraulic pressure in opposite directions from one another out of complementary piston chambers on opposite sides of the just mentioned reaction member 118 between clutches 4 and 5 on the input shaft 18. Axial movement of the pistons compresses the clutch plates against backing members such as the one typified by the forward clutch backing member 124. When engaged by the piston, the forward clutch 4 establishes forward drive from the input shaft 18, through the keyed on reaction member 118 and outer discs of the clutch 4, through the friction engaged inner discs of th clutch 4, thence from inner splines to the forward gear 46 to which the splines are made fast.

The shaft passage 116 terminates in a forward lube port 126 which radially communicates at its inner end with the passage 116 and at its outer end with a circumferential groove in the input shaft 18. A shuttling blocking lube sleeve 128 on the input shaft 18 is in the path of the forward piston 120 so as to be engaged and moved thereby between its returned position as shown in solid lines against a shaft snap ring 130 and an engaged position as corresponds to the engaged position of the clutch 4 and as shown in broken lines 132 closely adjacent a spring seat 134. The piston 120 and the shuttling lube sleeve 128 are controlled by hydraulic pressure and by sets of two and twelve, similar clutch disengaging return springs which are preloaded against the spring seat 134. One return spring of the set of two is illustrated at 136, and that two-spring set biases the sleeve 128 to its returned position. The set of twelve, not shown, directly engages and biases only the piston 120 to its returned position.

Cooling flow is normally at a lo rate in a path from the shaft passage 116, through the radial passage and forward lube port 126, through the shaft port groove, thence through a single restricted sleeve hole 138 to the clutch 4, which thus receives minor surface lubrication and cooling. But in the engaged position of the lube sleeve as shown by the broken lines 132, hi cooling flow occurs because of the path afforded by three sleeve holes 140 which communicate with the lube port 126 and port groove 148 by means of a sleeve groove 150 therebetween.

A reverse lube port 144 and a primary reverse shuttling blocking lube sleeve 146 cooperate in the same way with the primary reciprocal, reverse piston 122, the operation similarly being controlled by hydraulic pressure and by return springs. At least two springs in the set of the return springs also load the sleeve so as to bear lightly against and follow the piston at all times at which the latter is displaced.

OPERATION — FIG. 6

Cooling and lubricating flow from a first passage 152 in the shaft enters radially into the reverse port 144 which merges into a primary, radially facing circumferential groove 154 about the shaft. In reception therewith, the primary lube sleeve 146 presents the second passage holes 156 which are communicatively connected to the reverse clutch friction plates 5, not shown, and which include a secondary radially inwardly facing circumferential groove 158 effective to uncover the primary groove 154 beneath the primary lube sleeve 146 by axial movement of overlapping therewith.

The design providing for primary reciprocal piston 122 and primary lube sleeve 146 to be separable and separate along their radial, ring shaped interface of abutment is because of piston cocking, and at the same time because of the unsealed, close fit of the lube sleeve on the shaft 18. It is by reason of the primary lube sleeve 146 being capable of limitedly laterally sliding relative to the primary piston 122 that, when the primary piston 122 moves, the primary lube sleeve can freely partake of the movement and proportionately uncover the primary radially facing groove 154 with the secondary radially inwardly facing groove 158. The resulting valving opening is never unduly restricted, and is significant.

Figure 7:
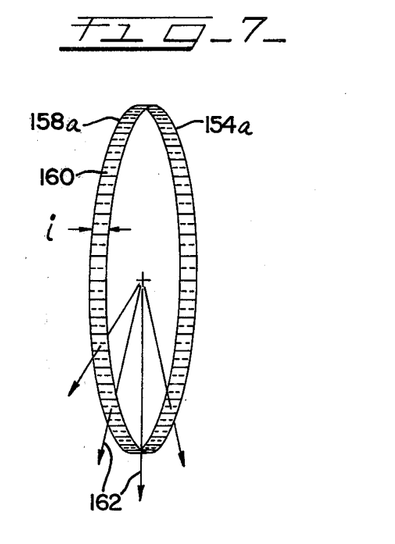
FIG. 7 is a schematic showing of the clutch hi-cooling valve position appearing in broken lines in FIG. 6, affording a breaking of the valving seal from its initial ring of substantially continuous sealing engagement circumscribing the clutch shaft, with the resulting large flow area of cooling path afforded by the open valving.

SUDDEN CHANGE IN RESTRICTION — FIG. 7

In this figure, which develops schematically the idea behind the primary and secondary grooves 154 and 158 of the immediately preceding discussion and the immediately preceding figure, the axial movement is brought out which results in corresponding axial overlap of grooves 154, 158 at the first increment of piston movement. What is produced is a valve transit primary flow passage indicated by the cross-hatched exposed annular area 160. Thus from the immediately preceding condition there occurs a sudden change to essentially free proportional cooling flow when the uncovering edge of the secondary groove in its illustrated position 158a and the uncovered edge of the primary groove in its illustrated position 154a overlap by the initial increment i of axial, valve-opening movement. That is, the outwardly facing shaft groove 148 (FIG. 6) becomes a chamber that is valve controlled at its outlet so that the discharge will be distributed over an entire circumference.

The circumferential length is of an exaggerated amount coextensive with that of both grooves 158, 154. Hence, outward cooling fluid flow indicated by radial arrows 162 is on an exaggerated front as compared to the usually found, unduly restricted, initial opening of the conventional round port valve, spool valve, or the like.

Other means can be provided for producing an equivalent change in restriction, involving face type seals having a smooth shoulder by which the lube pressure is sealed off. The several embodiments to follow employ just such a fixed, smooth shoulder, the seal of which is broken as soon as the clutch piston is actuated.

Figure 8:
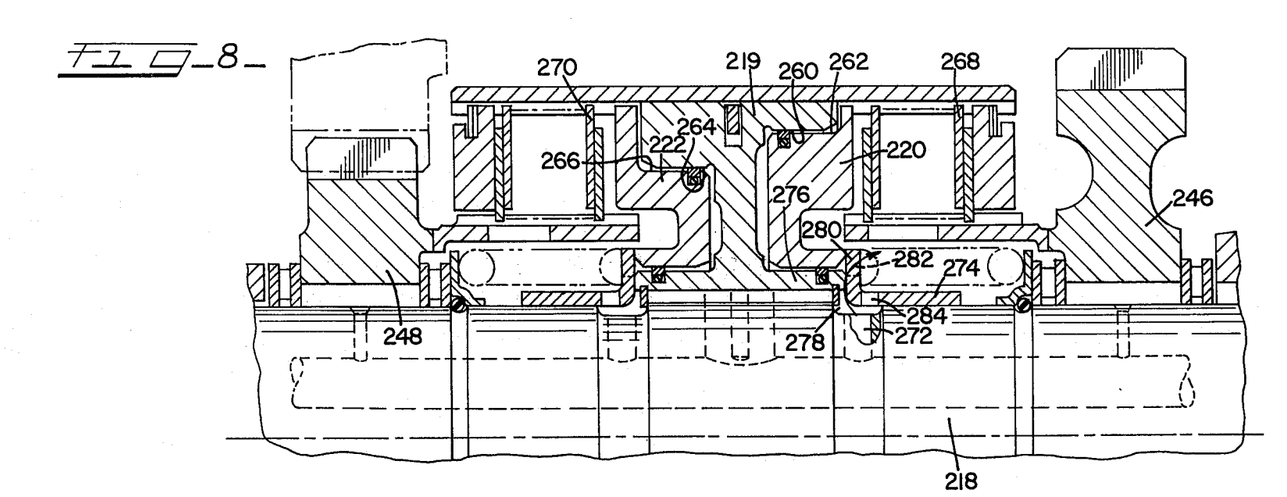
FIG. 8 shows a modified hi-lo flow valving suitable to cool the illustrated 2d speed and 3d speed ratio clutches in the output end of a transmission at its lower rear as oriented in preceding FIG. 4.

SMALL CLUTCH TYPE — FIG. 8

In the face seal arrangement of this figure which is particularly suited to small-clutch transmissions, the transmission input and output members comprise a supporting shaft 218 and supported gears 246, 248. Primary reciprocal pistons 220 and 222 on the shaft 218 have a common fluid reaction plate 219 in fixed location at their adjacent sides. A large diameter shoulder 260 on the plate 219 and a complementary large diameter reentrant angled portion 262 of the piston 220 form a cooperating piston and cylinder operable under high pressure clutch actuating pressure. A small diameter shoulder 264 on the plate 219 and a complementary small diameter reentrant angled portion 266 of the piston 222 form a high pressure piston and cylinder which is similar but has a less multiplied force reaction area and hence less thrust power because of the difference in shoulder diameters.

The friction engaging discs for second and third speeds respectively are shown at 268 and 270.

On the second speed side, which is typical, adjacent a first lube passage 272 formed of radially drilled oil passages in the shaft 218, primary and secondary lube sleeves 274, 276 in a mutually contacting, face seal position bridge across an annular chamber 278 in which the first passage 272 terminates. The primary lube sleeve 274 is separate from, and has four narrow, equally circumferentially spaced apart tangs 280 in the path of reciprocation of, the adjacent primary piston 220. It is because of the piston cocking that the sleeve 274 is a separate part, and the tangs 280 on the sleeve 274 render it capable of limitedly laterally sliding whereby, with the close clearance held between the sleeve 274 and shaft 218, the piston 220 is still free to cock — due to nonparallelism and/or non-squareness of parts — and adjust to nonparallelism without binding of the piston or the close fitting lube sleeve 274. The close clearance of the latter eliminates need of any direct seal between the sleeve and supporting shaft 218.

When the piston 220 moves the primary sleeve 274 with respect to the unmoving sleeve 276, the piston thus opens up an unbridged space between the noncontacting face seal type sleeves 274, 276 to accommodate cooling fluid flow in the direction of an arrow 282 in a second passage means communicatively connected to the disks 268 to cool and lubricate them. The secondary sleeve 276 and the plate 219 are characterized by being adjacent, fixed, and integral with one another, and the sleeve 276 defined the unmoving, smooth shoulder by which the flow is sealed off or opened past the broken seal.

The essentially free flow path in the direction of the arrow 282 is operatively the same as that of the cross-hatched exposed annular area indicated at 160 in preceding FIG. 7, with the circumferential length coextensive with that of each of the primary lube sleeve 274 and of the secondary lube sleeve 276. A third passage 284 in the form a permanently open sleeve hole provides a secondary, full time flow of cooling fluid independently of the off-on primary flow in the direction of the arrow 282 as valve controlled.

Figure 9:
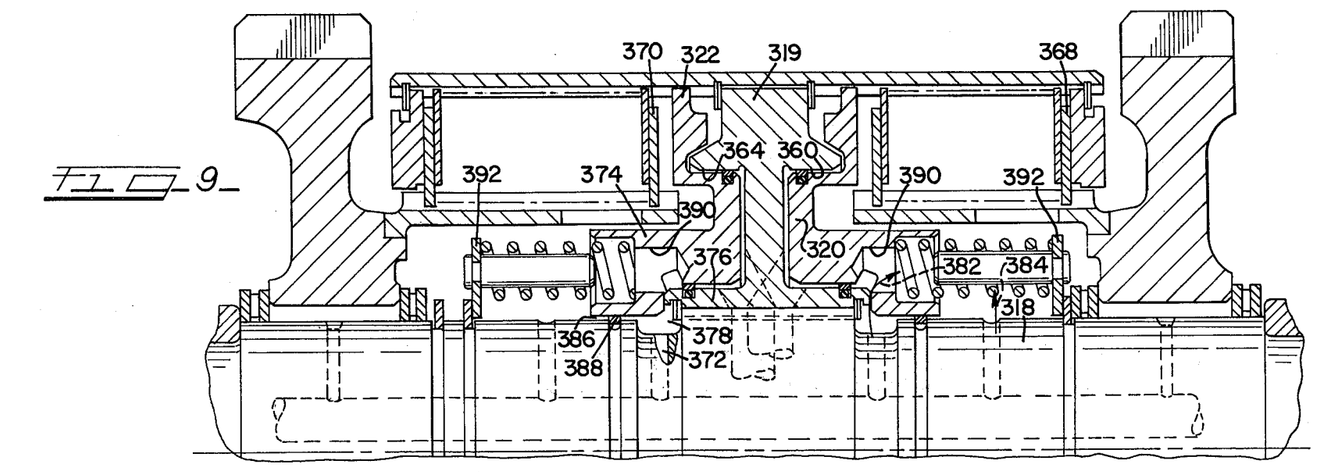
FIG. 9 shows a further modification for cooling the illustrated forward-reverse clutches at the front end of a transmission.

MEDIUM CLUTCH TYPE — FIG. 9

In the face seal arrangement of this figure which is designed primarily for medium-clutch transmissions, the shoulder 360 on a common reaction plate 319 and the shoulder 364 thereon have the same diameter, and therefore the cylinder and piston 320 for a stack of forward friction engaging plates 368 has the same pressure movable area and high pressure force as the cylinder and piston 322 for a stack of reverse friction engaging plates 370.

Not only is a secondary lube sleeve 376 adjacent, fixed, and integral with the plate 319, but also a cooperating primary lube sleeve 374 is adjacent to, integral with, and movable in unison with the primary receiprocal piston 322.

Piston cocking is accommodated by reason of large sleeve clearance provided at 386, and a necessary additional shaft seal at 388 as militated by the integral piston 322 and sleeve 374 design.

The valve bridge area which is in valve-open position when the primary and secondary sleeves 374, 376 are noncontacting and which is in valve-closed position when there is mutual contact, controls an annular chamber 378 in which a first, radially discharging, shaft passage 372 terminates. An annular area corresponding to the cross hatched area 160 of preceding FIG. 7 is exposed in the valve-open position and opens second passages.

The second passages, in the direction of an arrow 382, include a return spring bore 390 in each lube sleeve and communicatively connect with the respective forward and reverse clutch discs 368, 370. Third passages of which one is indicated by an arrow 384 lead in a space between a return spring seat 392 and each primary piston to establish secondary, full time cooling flow from the shaft 318 to the associated forward and reverse clutch discs thereabout. The secondary flow path is permanently open and, though small, is independent of the off-on primary flow which is valve-controlled.

Figure 10:
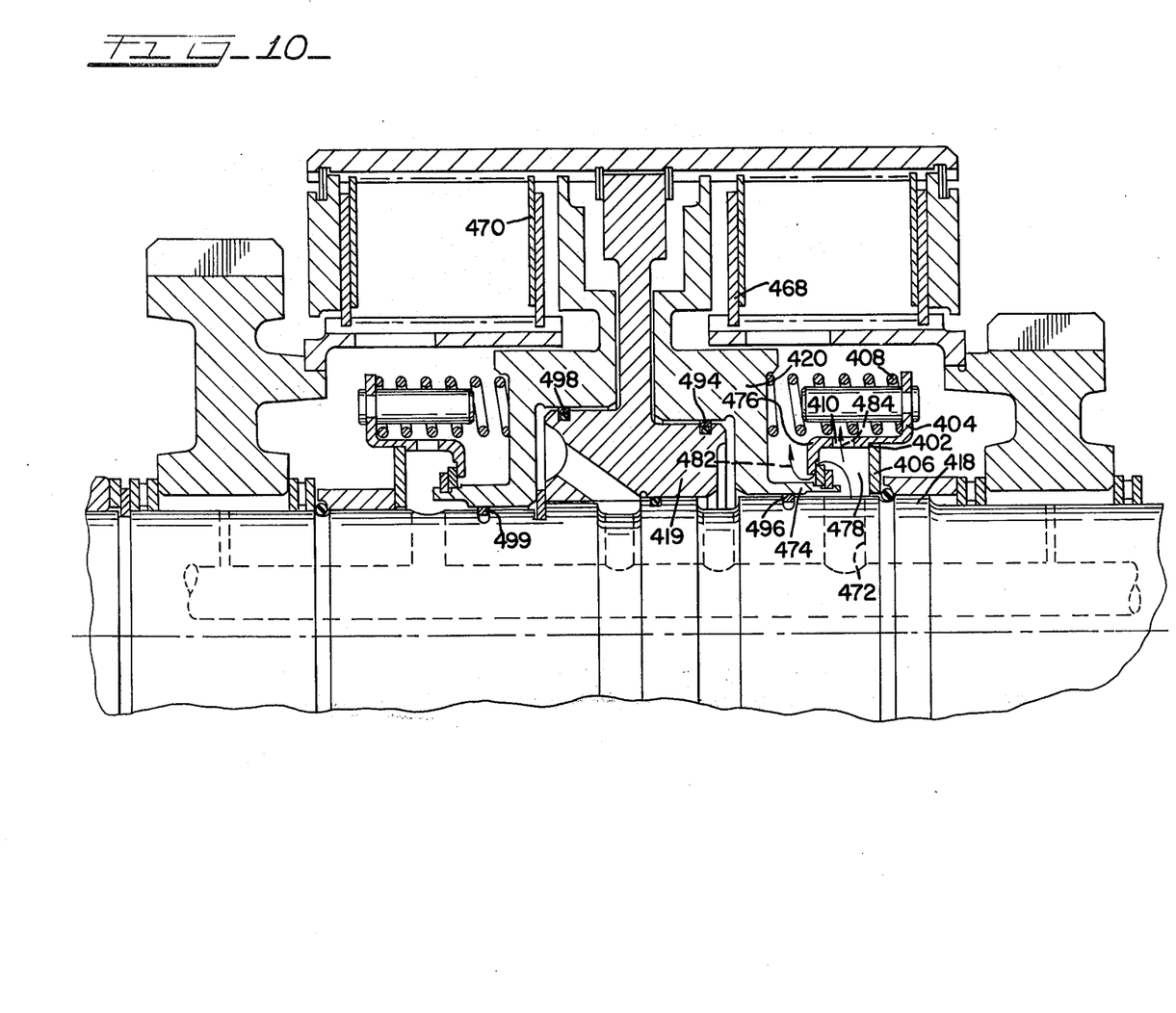
FIGS. 10 and 11 show further modifications for cooling output end, speed-ratio clutches, primarily the large clutches designed for heavy duty transmissions.

LARGE CLUTCH TYPE — FIG. 10

For purposes of the large, second speed and third speed clutches 470, 468 for which the clutch assembly of this figure is designed, the diameters of the four piston seals 494, 496, 498, 499 are kept as small as possible to reduce the centrifugal head on the high pressure clutch actuating oil and to utilize as large as possible a piston area, the largest required to be afforded being for the first-speed clutch, not shown.

The assembly, having the integral piston and lube sleeve as at 420, and thus requiring a sleeve loose-fit and the consequent shaft seals at 496 and 499, is in these respects similar to the assembly of immediately preceding FIG. 9. The assembly, having further the different diameter pistons such as primary piston 420 as measured by the effective diameter of its outer seal 494, is in this respect similar to the assembly as shown in preceding FIG. 8.

Uniquely to the present assembly, however, the secondary lube sleeves take a relatively inverted position and can be found spaced apart from, and as separate pieces from, the common reaction plate 419, as exemplified by the secondary sleeve 476 shown adjacent its cooperating primary lube sleeve 474.

The secondary sleeve 476, which is a typical lube sleeve in the assembly, has a shoulder 402 and a radial flange 404 by which it is trapped immovably between a respective backing ring 406 on the assembly shaft 418 and a set of third speed, clutch return springs 408.

By reason of its noted inverted position, and being a separate part, the secondary sleeve 476 forms the outer wall of an annular chamber 478, and has three functions thereat. It provides a permanently open, secondary flow port 410 formed therein for continuously feeding a lo flow of cooling fluid, supplied by a radial, first shaft passage 472, to the surrounding third speed clutch 468 through a third passage as indicated by a flow arrow 484. The secondary sleeve 476 also provides a ring valve engaging, unmoving, smooth shoulder of sealing contact for the primary sleeve 474 on the piston 420, so that the piston when undergoing its first increment of clutching movement causes a sudden change in restriction; free primary flow from the first passage 472 follows in the direction of an arrow 482 so as to cross the resulting unbridged annular space and make a second passage to the surrounding third speed clutch discs 468. Finally the secondary sleeve 476 presents the radial flange 404 in its purely mechanical function as a spring seat common to all return springs 408.

Figure 11:
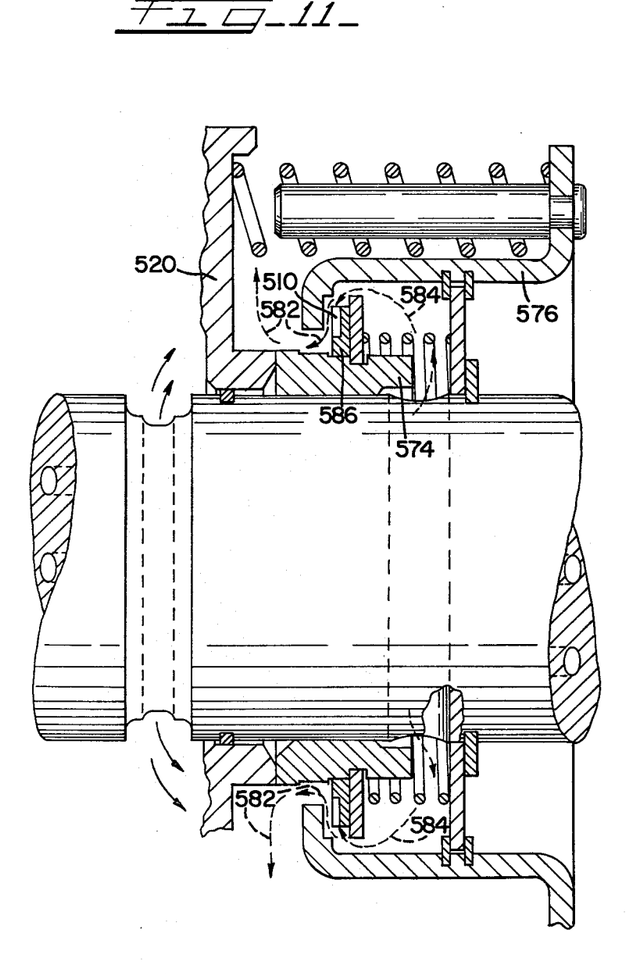

LARGE CLUTCH MODIFICATION — FIG. 11

For purposes of the modified assembly which, as shown in this figure, is also primarily adapted for large clutches and hence as minimized a centrifugal head as possible, the assembly has the separate, inverted-position lube sleeve 576 and, in these respects, is similar to the assembly as shown in the immediately preceding FIG. 10. Uniquely however, the assembly is designed with no one-piece piston structure or apertured lube sleeve; instead, third passage notches 510 in a valve ring 586 affixed to the primary sleeve 574 allow secondary cooling flow in a third passage in the direction of an arrow 584, independently of whether the contacting smooth shoulder of the secondary sleeve 576 is sealing or has the bridging seal broken. Besides, the piston structure has two main pieces consisting of a primary reciprocal piston proper 520, and the primary sleeve 574 which is in the path of reciprocation of the piston proper 520.

The valve-open position makes it apparent that, with the first increment of shift of the primary piston and sleeve 574, there is a sudden change in restriction enabling primary flow to freely cross the resulting annular, bridged space area and follow the path of two arrows 582 tracing out a second passage to the surrounding clutch discs, not shown.

COMPATIBLE DUAL OPERATIONS

In the regular hydraulic control circuit hereof, not shown, a key element provided is an hydraulic sequence valve insuring not only that a direction clutch and a speed clutch will be separately supplied with actuating fluid flows each modulated under the proper pressure during a shift, but also that such dual operation will always follow the same sequence of selected direction clutch first and selected speed clutch second. A suitable sequencing valve, not essential to this disclosure, is separately disclosed and claimed in detail in co-pending Horsch application Ser. No. 654,427 filed Feb. 2, 1976, and now U.S. Pat. No. 4,046,160, owned by the same assignee and incorporated by its subject matter in entirety herein by reference.

It is to be understood that fluid pressure control exerted at the right time automatically by such a clutch sequencing valve for dual operation of the direction and load clutches, respectively, is not interfered with by the hi-lo clutch cooling control in its dual operation. Tha is to say, fluid flow control maintained by the individual shuttling blocking sleeves for dual operation, at the right time, of directed lo cooling flow and unblocked hi cooling flow to each clutch does not interfere with the pressure level at a sequencing valve in its dual operation. The respective circuits and the respective three stages of pressure thereof are kept separate by the standard high, intermediate, and low regulator valves, not shown.

Effective at the optimum time therefor, the restricted lube oil has a lo flow rate, established by the blocking sleeves when the clutch discs are disengaged, to slightly wet and prevent such discs from dragging against one another in dry state. Effective at the optimum time therefor, the lube oil is unblocked by the lube sleeves for hi cooling flow to the clutch discs while at and to and from their engaged position. The comparatively drastically multiplied open-valve flow area exposed with the very first increment of shift movement here makes the outset of clutch flooding almost instantaneous. By being so flooded with cooling oil, the clutch discs as they unavoidably slip under load in engaging and disengaging are cooled with adequate liquid. So on the other hand they are not overheated and they are not overheated when engaged after stopping all slippage, while on the other hand at the same time the plurality of disengaged clutches consumes a minimal amount and requires a minimal amount of the lube oil. Precisely as desired, the non-selected clutches avoid any appreciable waste of fluid flow, needed by the selected clutches or clutch, because of the lube sleeves, and such fluid flow is prevented from wasting or dropping down the line fluid pressure because the fluid flow and fluid pressure control circuits are separate.

That is to say, specifically in that portion of the transmission illustrated in FIG. 1, for example, when the blocking sleeve 128 or 146 for one selected direction clutch 4 or 5 is directing coolant to the selected clutch during its engagement, the blocking sleeve for the other direction clutch is blocking same to conserve the consumption of lube oil flow, all the while that the shuttling blocking sleeve 148 (FIG. 2) on the output shaft 20 and an intermediate clutch blocking sleeve 148$i$ and a high clutch blocking sleeve 148$h$ are likewise conserving lube oil in the shaft 20. Subsequently when the associated one of the sleeves 148, 148$i$, and 148$h$ moves into the unblocking position to flood the selected load clutch 1, 2 or 3, the other two of the three sleeves 148, 148$i$, and 148$h$ on the output shaft 20 conserve flow in their blocking position; likewise, one of the two sleeves 128 or 146 on the input shaft 18 is conserving lube oil flow because the associated sleeve for the selected direction clutch is the only one occupying unblocking position.

While the engaged clutch in the direction clutch set on the shaft 18 and the engaged clutch in the load set on shaft 20 are in engaged position or are being disengaged, lube flow is still being conserved by the associated sleeves respectively for the other two clutches in the load set and for the other clutch in the direction set.

Finally, flow is conserved by all five sleeves 128, 146, 148, 148$i$, and 148$h$ when all clutches are in the disengaged position due to the transmission disclosed being in neutral. The same principles equally apply to other transmissions in which all of the friction engaging devices or less than all are oil cooled fluid pressure operated brakes, such as commonly employed in transmissions including power shift planetary transmissions.

Variations within the spirit and scope of the invention described are equally comprehended by the foregoing description.

What is claimed is:

1. Frictionally engageable, fluid cooled assembly for a transmission drive having:
   input and output members comprising a supporting shaft and supported gear means rotatably related therewith;
   primary reciprocal piston means shiftably and hydraulically actuably related to the shaft and having a fluid reaction plate at an adjacent side of the piston means;
   friction engaging means about the shaft associated with the nonadjacent side of the piston means and frictionally engageable thereby during a shift to establish a drive coupling the input and output members;
   first passage means in the shaft for transmitting clutch cooling flow; and
   primary reciprocal lube sleeve and secondary lube sleeve means bridging in a mutually contacting, bridged position across an annular chamber about said shaft terminating said first passage means, said primary and secondary lube sleeve means being supported about said shaft generally inside said friction engaging means and mutually defining an unbridged space when noncontacting to open second passage means communicatively connected to said friction engaging means;

said primary reciprocal lube sleeve means connected for movement with the primary reciprocal piston means, all with respect to relatively unmoving secondary lube sleeve means whereby, upon predetermined initial shift of the primary reciprocal piston means for causing friction engagement and consequent relative movement of separation between the bridging primary and secondary lube sleeve means, a valve transit primary flow path so opened between the annular chamber outlet and the second passage means at the unbridged space is an exposed annular area with a circumferential length coextensive with that of both the primary and the secondary lube sleeve means;

said secondary lube sleeve means where bridging with the primary lube sleeve means each confronting the other with a relatively moveable smooth shoulder of ring-valve-presenting contact and establishing cooperation in a substantially continuous ring of sealing engagement circumscribing said shaft, said secondary lube sleeve means also presenting flange means for seating thereon return springs for the primary reciprocal piston means, and further presenting third passage means in the secondary lube sleeve means effective independently of the first and second passage means for permanently open, communicative connection to said friction engaging means.

2. Frictionally engageable, fluid cooled assembly for a transmission drive having:

input and output members comprising a supporting shaft and supported gear means rotatably related therewith;

primary reciprocal piston means shiftably and hydraulically actuably related to the shaft and having a fluid reaction plate at an adjacent side of the piston means;

friction engaging means about the shaft associated with the nonadjacent side of the piston means and frictionally engageable thereby during a shift to establish a drive coupling the input and output members;

first passage means in the shaft for transmitting clutch cooling flow; and primary reciprocal lube sleeve and secondary lube sleeve means bridging in a mutually contacting, bridged position across an annular chamber about said shaft terminating said first passage means, said primary and secondary lube sleeve means being supported about said shaft generally inside said friction engaging means and mutually defining an unbridged space when noncontacting to open second passage means communicatively connected to said friction engaging means, said primary reciprocal lube sleeve means connected for movement with the primary reciprocal piston means, all with respect to relatively unmoving secondary lube sleeve means whereby, upon predetermined initial shift of the primary reciprocal piston means for causing friction engagement and consequent relative movement of separation between the bridging primary and secondary lube sleeve means, a valve transit primary flow path so opened between the annular chamber outlet and second passage means at the unbridged space is an exposed annular area with a circumferential length coextensive with that of both the primary and the secondary lube sleeve means.

3. The invention of claim 2, characterized by:

said fluid reaction plate and secondary lube sleeve means being adjacent, fixed, and integral with one another.

4. The invention of claim 2, characterized by:

said primary piston means and primary lube sleeve means being adjacent, integral, and therefore moveable always in unison with one another.

5. Frictionally engageable, fluid cooled assembly for a multispeed transmission having:

input and output members comprising a supporting shaft and supported gear means rotatably related therewith;

primary reciprocal pistons shiftably and selectively actuably related to the shaft and having a fluid reaction plate common to the primary reciprocal pistons at their adjacent sides;

a large diameter shoulder on the common fluid reaction plate and a complementary large diameter reentrant angled portion of one of the primary pistons forming a cooperating piston and cylinder which are pressure operable under high pressure;

a small diameter shoulder on the common fluid reaction plate and a complementary small diameter reentrant angled portion of the other primary piston forming a cooperating piston and cylinder which are operable by the high pressure;

the difference in shoulder diameters of the common fluid reaction plate enabling the high pressure to exert in one piston and cylinder a larger force compared to the other;

friction engaging means about the shaft which are associated with the nonadjacent sides of the respective primary reciprocal pistons and which are frictionally engaged during a shift to establish a drive coupling the input and output members selectively;

first passage means in the shaft for transmitting clutch cooling flow; and primary reciprocal lube sleeve and secondary lube sleeve means bridging in a mutually contacting, bridged position across an annular chamber about said shaft terminating said first passage means, said primary and secondary lube sleeve means being supported about said shaft generally inside said friction engaging means and mutually defining an unbridged space when noncontacting to open second passage means communicatively connected to said friction engaging means;

said primary reciprocal lube sleeve means being connected for movement with the primary reciprocal pistons, all with respect to relatively unmoving secondary lube sleeve means whereby, upon predetermined initial shift of a primary reciprocal piston for causing selective friction engagement and consequent relative movement of separation between the bridging primary and secondary lube sleeve means concerned, a valve transit primary flow path so opened between the annular chamber outlet and second passage means at the unbridged space is an exposed annular area with a circumferential length coextensive with that of both the primary and the secondary lube sleeve means concerned.

6. The invention of claim 5 characterized by:

each primary reciprocal lube sleeve means consisting of a separate lube sleeve in the path of shift of a different one of the selectively actuable, primary reciprocal pistons and capable of limitedly laterally sliding relative thereto so as to open the valve transit primary flow path into the second passage means without interference despite piston cocking during its predetermined initial shift aforesaid.

7. The invention of claim 5 characterized by:
the common reaction plate being spaced apart from and a separate piece from each of the secondary lube sleeve means.

8. The invention of claim 5 characterized by:
at least one of the primary and secondary lube sleeve means being adjacent and fixed integrally with at least one of the pistons and common reaction plate.